United States Patent
Iwamura et al.

(10) Patent No.: US 7,107,150 B2
(45) Date of Patent: Sep. 12, 2006

(54) MAP GENERATING SYSTEM AND MAP MANAGEMENT SYSTEM

(75) Inventors: Kazuaki Iwamura, Nishitokyo (JP); Keiro Muro, Koganei (JP); Shintaro Hatsumoto, Sakura (JP); Shu Tezuka, Hitachi (JP); Yukio Funyu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 542 days.

(21) Appl. No.: 10/703,420

(22) Filed: Nov. 10, 2003

(65) Prior Publication Data

US 2004/0111213 A1    Jun. 10, 2004

(30) Foreign Application Priority Data

Nov. 11, 2002 (JP) ............................. 2002-326259

(51) Int. Cl.
*G01C 21/30* (2006.01)

(52) U.S. Cl. ....................... 701/208; 701/210

(58) Field of Classification Search ................ 701/200, 701/201, 202, 203, 204, 205, 206, 207, 208, 701/209–213, 300; 340/995.1–995.28; 342/357.01–357.13
See application file for complete search history.

(56) References Cited

U.S. PATENT DOCUMENTS 5,802,492 A * 9/1998 DeLorme et al. .......... 455/456.5
6,119,066 A * 9/2000 Sugiura et al. ............. 701/208
6,163,749 A * 12/2000 McDonough et al. ....... 701/208
6,321,158 B1 * 11/2001 DeLorme et al. ........... 701/201
6,470,263 B1 * 10/2002 Ito et al. ..................... 701/201
6,870,608 B1 * 3/2005 Detweiler et al. ......... 356/141.1

OTHER PUBLICATIONS

"Geographic Information Systems *GIS*", GIS and Mapping software, Redlands, CA 92373, www.gis.com/whatisgis/index.html.

* cited by examiner

*Primary Examiner*—Richard M. Camby
(74) *Attorney, Agent, or Firm*—Reed Smith LLP; Stanley P. Fisher, Esq.; Juan Carlos A. Marquez, Esq.

(57) ABSTRACT

There have been problems in the facility information management system arts because when a distance-based facility database is searched for the facility information by specifying the name and distance of a facility, the location and position of a specific facility must be found on a figure such as a map. Such a location is not easily pointed out especially when the facility is damaged. To overcome the above problems, the present invention relates the distance-based facility data with map data and allows a generation of graphical figure data to be overlaid on a map from the numerical data corresponding to the facility parameters stored in the distance-based facility data.

13 Claims, 7 Drawing Sheets

MAP DATA

GENERATION OF PLANAR FACILITY DATA

GENERATION OF PERSPECTIVE FACILITY DATA

MAP GENERATING SYSTEM AND MAP MANAGEMENT SYSTEM

PRIORITY CLAIM

This application claims priority to Japanese patent application P2002-326259 filed Nov. 11, 2002 under 35 U.S.C. 119, the entire disclosure of which is incorporated herein by reference.

FIELD OF THE INVENTION

The present invention is directed to a geographic information system (GIS), and more specifically to a new system that allows generating graphical figures of facilities on a map by using facility parameters stored in a distance-based building management database. The databases include data consisting of a relation between a distance from an origin coordinate and various facility data.

BACKGROUND OF THE INVENTION

In typical database systems, Information with respect to any facilities, including railway installations, road facilities, and river facilities may be managed as data, which corresponds to a predetermined origin coordinate with a distance therefrom to a building (sometimes referred to as mileage data). More specifically, facility information may include the construction date, management number, structure information such a wall thickness for example and so on. The information about the buildings may be managed so as to relate the distance from a predetermined origin to the start point of the facility and to the end point of the facility. For example, a bridge has a first end or start point and also a second end or end point.

When the above described facility information is stored in a database, an information retrieval search may be performed by using the name or distance of, for example, a building as a search key. In this search method although the distance to the building will be found, its geographical position will not be clear. For example, searching on a map is required to find the exact position. Thus, in order to find the position and contents of a facility, it is necessary to perform a retrieval search on not only a database but also a reference to a map. In such a method, the identification of a position for example in case of an occurrence of damage to a facility has not been easily performed.

Moreover, even when both the facility data and the map data are computerized, since these data sets are not related to each other, there will be no guarantee that an update to the one will be reflected to the other. When an update of the one is not correctly reflected to the other, there can be inconsistencies between data sets. In such a case, the reliability of the map data and facility data will be ultimately degraded.

Therefore, the facility data and map data are required to be reliably related so as to allow finding the position of a building on a map, and to be updated correctly so as to have no inconsistency between the facility data and map data.

SUMMARY OF THE INVENTION

This summary teaches selected features of the invention and is not limiting or a complete accounting of the invention, per se.

In order to overcome the above described problems, the system and method of the present invention by relating the distance-based facility data with the map data, a three dimensional (3D) graphical data representation will be generated from any numerical data corresponding to the facility parameters stored in the distance-based facility data and will be overlapped to a map. To do this, graphical facility data derived from the distance-based facility data will be generated by using a generation system wherein the system is connected to a recording means for recording map data having a skeletal graphics of facilities. The system is also connected to facility management data that coordinates an origin coordinate with a distance from the origin coordinate to a starting point and to an end point of a graphical figure of a facility. The system further comprises a search means for searching for a position corresponding to said origin coordinate from within said map data, and a means for determining a proper generation range of said facility graphical figure by using data of said skeletal graphics. Also included is a means for generating said facility graphical figure by means of a facility graphical figure generation program by using facility parameters stored in said facility management data. A display means may be included for displaying a generated graphical figure of said facilities on a map generated from said map data.

The graphical figures are very useful when overlaid onto a map. For example, a 3D figure of a tunnel overlaid onto a map can be readily used to mathematically compute noise data of the tunnel from the volume of the tunnel and its dimensions. Another, example is that the 3D representations are very useful for maintenance workers or traveler's who need directions to the facility via a visual orientation to the facility.

DETAILED DESCRIPTION OF THE PREFERRED EMBODIMENTS

In the present invention the facility data and map data are related by introducing a map structure generating method which generates graphical data from numerical data indicative of facility data to draw over a map. More specifically, only a rough outline figure, that will be used as a guide for generating the exact figure from the facility data (referred to as skeletal graphics herein below), may be created on the map data. The distances from the origin coordinate to the start point and end point stored in the facility data may be used for tracing the skeletal graphics based on a respective distance in order to specify the range of graphical figure generation. Then, a graphical figure generation function for generating facility figures from the graphical figure generation function library may be selected to input the facility data to thus selected graphical figure generation function to generate the facility graphical figure and to generate the facility data represented by graphical figures. The map generating system of the present invention will have components as follows:

(1) Map Data Storage 101

A data storage medium for storing the skeletal graphics constructed from coordinate arrays and the map data composed of vector figures representing any other topographic features. This unit may be for example a hard disk drive.

(2) Distance-based Facility Data Storage Unit 102

A data storage medium for storing distance-based facility data (referred to as facility data herein below) managed for storing information of the facilities and related distance from a predetermined origin coordinate to the start and end points of those facilities. The facility data may include, for example, for a bridge, the distance from the origin coordinate of the skeletal graphics corresponding to the facility information to the starting point of graphics generation, distance from the origin to the end point of graphics generation, graphics generation function number, overpass graphics number, width of the overpass, height of the overpass, wall graphics number, wall thickness, wall height, as well as the construction date, detail of the structure and so on. This list is only for a bridge example and is not limiting. Obviously, it represents a minimum of data, i.e., a tall building would have many more data points for example. This unit may be a hard disk unit.

(3) Map Generator 103

Figure 1:
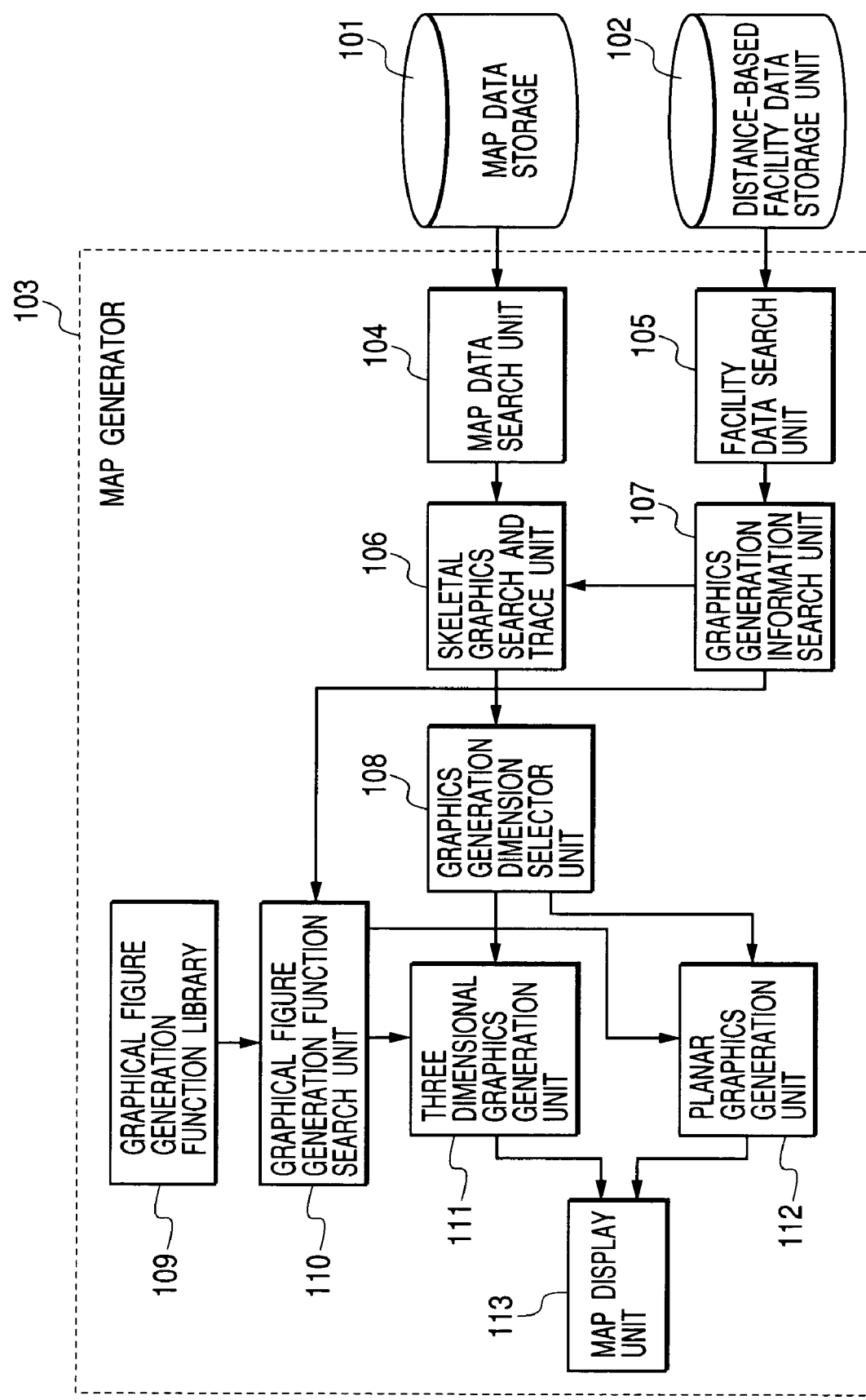
FIG. 1 is a schematic diagram illustrating a map generation system using the distance-based facility data and map data.

A function that generates a map with data from a facility data, is composed of the functions 104 to 113 on FIG. 1. Those sub-functions will be as follows:

(4) Map Data Search Unit 104

This unit performs a retrieval search of map data on the map data storage 101.

(5) Facility Data Search Unit 105

This unit performs a retrieval search of facility data from the distance-based facility data storage unit 102.

(6) Skeletal Graphics Search and Trace Unit 106

This unit performs a retrieval search of a graphics of guidance (skeletal graphics) from within the map data, traces the skeletal graphics from the data of distance between an item of facility data, the origin coordinate and the starting point and end point, and determines the range of graphics generation.

(7) Graphics Generation Information Search Unit 107

This unit performs data items required for graphics generation from the facility data retrieved in the facility data search unit 105.

(8) Graphics Generation Dimension Selector Unit 108

This unit determines whether the graphics should be generated as three dimensional (3D) or two dimensional (2D).

(9) Graphical Figure Generation Function Library 109

A program library containing graphical figure generation function programs that perform generation of facility graphics using the data items of facility data as parameters.

(10) Graphical Figure Generation Function Search Unit 110

This unit performs a retrieval search of a graphical figure generation function program from within the graphics generation dimension selector unit 108.

(11) Three Dimensional Graphics Generation Unit 111

This unit generates a three dimensional graphics according to the graphical figure generation function and figures at the crossover of graphics.

(12) Three Dimensional (2D) Graphics Generation Unit 112

This unit generates a two dimensional graphics according to the graphical figure generation function and figures at the crossover of graphics.

(13) Map Display Unit 113

This unit displays thus generated map data.

Figure 2A:
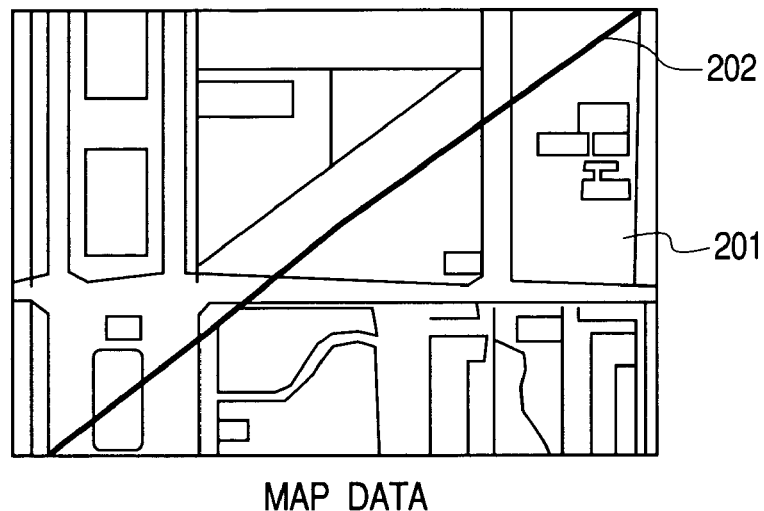
FIG. 2A, FIG. 2B, and FIG. 2C show exemplary displays of map generation.
Figure 2B:
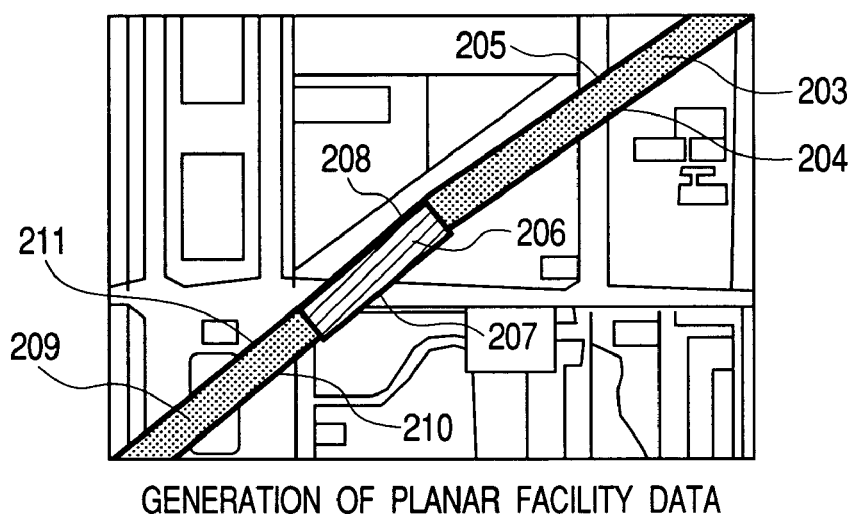
Figure 2C:
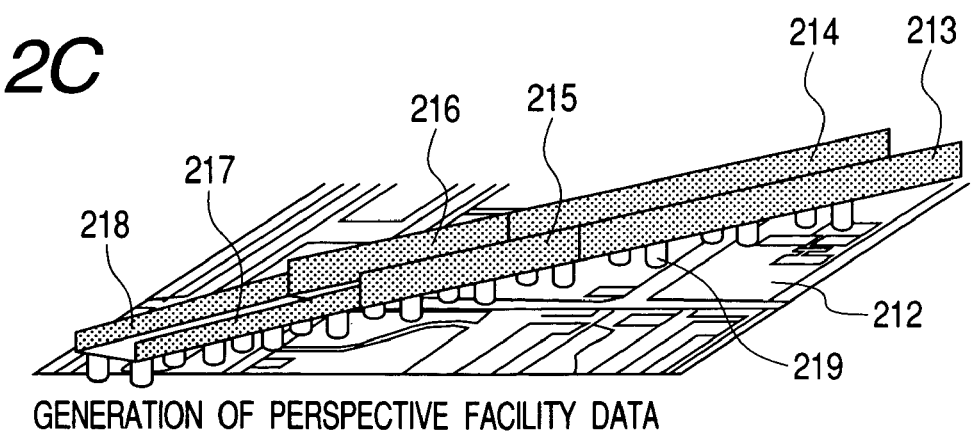

For the generation of a map using the distance-based facility data, an exemplary generation of an elevated bridge data is shown in FIGS. 2A to 2C.

FIG. 2A is a map data 201 retrieved from the map data storage 101, in which the skeletal graphics 202 indicative of an elevated bridge is described.

FIG. 2B is an example of generated two dimensional graphics data 203 to 211 along with the skeletal graphics 202. In this figure, graphics FIGS. 203, 204, 205 are designated to graphics representing an elevated bridge, graphics FIGS. 204, 204, 207, 208, 210, 211 are graphics representing walls.

FIG. 2C is an example of generated data of an elevated bridge in a three dimensional figure along with the skeletal graphics 202 by changing the view point of the plain map data 201 to the perspective map 212. In FIG. 2C wall data items 213 to 218 are generated. The correspondence of wall data items with FIG. 2B may be as follows: 204 to 213, 205 to 214, 207 to 215, 208 to 216, 210 to 217, and 211 to 218. Also in this figure is displayed bridge pier data 219. The bridge pier data is a graphics figure that will be generated only when displayed in a perspective view.

Figure 3:
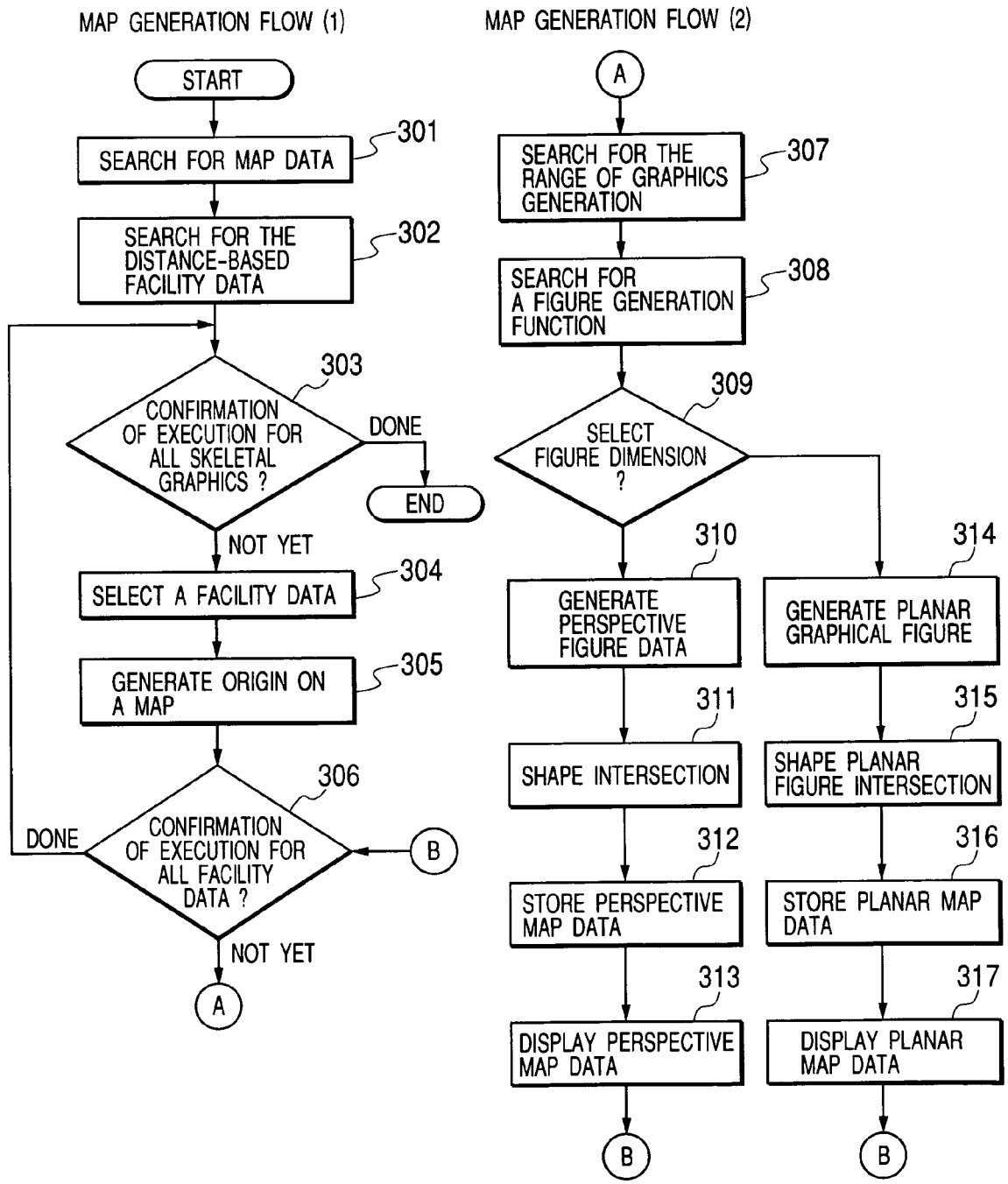
FIG. 3 is a schematic flow diagram of map generation.

Steps for generating map data are shown in FIGS. 2A to 2C by using the distance-based facility data is shown in FIG. 3. The relationship between the facility data and map data is shown in FIG. 4.

Step 1: Search for Map Data (step 301)

Figure 4:
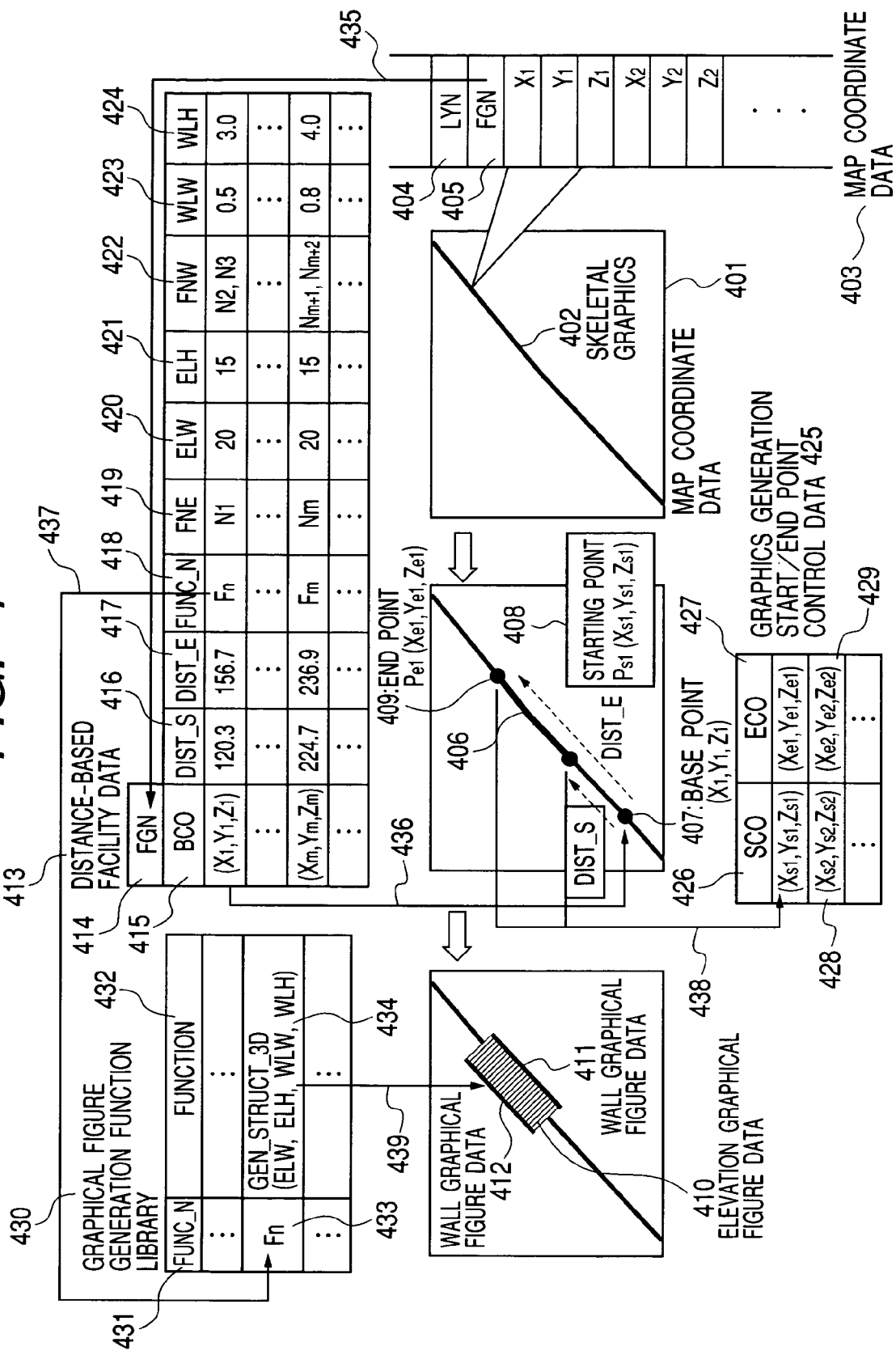
FIG. 4 is a schematic diagram of data relation for the creation of map from the distance-based facility data.

The map data search unit 104 will perform a retrieval search for map data 401 as shown in FIG. 4, from within the map data storage 101. In this data a skeletal graphics 402 is included for the guidance of generation of graphics data of a facility.

Step 2: Search for the Distance-based Facility Data (step 302)

Figure 5:
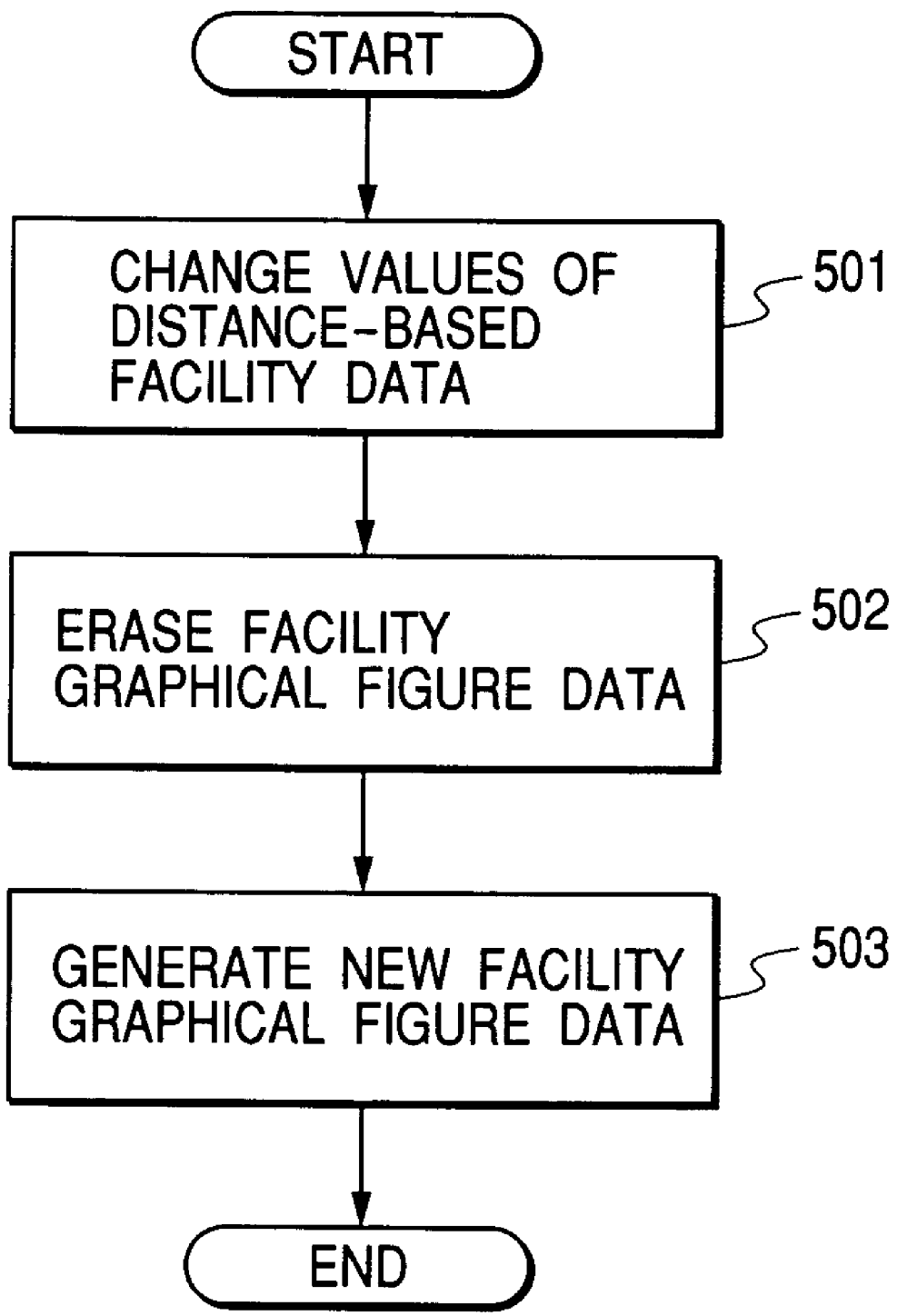
FIG. 5 is a schematic flow diagram of map update.

The facility data search unit 105 will perform a retrieval search for distance-based facility data 413 as shown in FIG. 5 from within the distance-based facility data storage unit 102.

Step 3: Confirmation of Execution for all Skeletal Graphics (step 303)

Every skeletal graphics included in the map data 401 will be determined whether or not to have executed the succeeding step 304 and subsequent steps. If not executed, then a skeletal graphics will be retrieved so as to execute step 304 and subsequent ones. If executed then the process will be terminated. This search for skeletal graphics will be performed from within the map data in the skeletal graphics search and trace unit 106. This search will refer to the layer number 404 of the map coordinate data 403 to select a skeletal graphics having a layer number corresponding to the skeletal graphics and the map coordinate data 403.

Step 4: Selection of a Facility Data (step 304)

The skeletal graphics search and trace unit 106 will perform a retrieval search for the distance-based facility data 413 corresponding to the figure number (FGN) 405 of the skeletal graphics from within the facility data found in step 302 (coordination 435).

Step 5: Generation of Origin on a Map (step 305)

The graphics generation information search unit 107 will perform a retrieval search for a base coordinate (BCO) 415 stored in the facility data found in step 4 (step 304) and will place it on the point 407 on the skeletal graphics 402 (coordination 436). This base point coordinate may or may not correspond to the coordinate of skeletal graphics. There also may be cases in which the coordinate does not exist on the skeletal graphics due to the insufficient accuracy of the map. In such a case a vertical line is dropped from the base coordinate to the nearest line segment that is a component of the skeletal graphics, to define a new base coordinate at the intersection.

Step 6: Confirmation of Execution for all Facility Data (step 306)

Every base coordinate described in the distance-based facility data 409 is determined whether or not to have executed. If not then step 307 and subsequent steps will be performed there on, and if done then step 303 will be performed.

Step 7: Search for the Range of Graphics Generation (step 307)

The skeletal graphics search and trace unit 106 traces the skeletal graphics 402 from the origin coordinate up to the distance between the origin coordinate to the starting point (DIST_S) 416 and to the distance between the origin coordinate to the end point (DIST_E) 417, to specify the position of the starting point and end point on the map to determine the range of graphics generation. The coordinates of the starting point Ps1 408 and end point Pe1 409 will be stored in the graphics generation start/end point control data 425 (coordination 438). The starting point is SCO 426, and the end point is ECO 427, therefore the coordinate of Ps1 will then be (Xs1, Ys1, Zs1) 428, while the coordinate of Pe1 will be (Xe1, Ye1, Ze1) 429.

Step 8: Search for a Figure Generation Function (step 308)

The graphical figure generation function search unit 110 will select a function for generating the graphical figure of a facility among those within the graphical figure generation function library 109. In the graphical figure generation function library 430 stored are graphical figure generation function scripts (FUNCTION) 432 corresponding to a function number FUNC_N 431, among which a graphical figure generation function 434 corresponding to a number 433 identical to the graphical figure generation number (FUNC_N) 418 stored in the distance-based facility data 413 (coordination 437).

Step 9: Selection of Figure Dimension (step 309)

In this step a displaying dimension will be selected. The display dimension will be determined by the script of the graphical figure generation function 434. The graphical figure generation function 434 script has a notion "3D" in its name indicative of a perspective presentation. If the display dimension is perspective, then step 310 and subsequent will be performed, while on the other hand if it is two dimensional (planar) then step 314 and subsequent will be performed.

Step 10: Generation of Perspective Figure Data (step 310)

The three dimensional graphics generation unit 111 will generate a perspective elevated bridge data according to the graphical figure generation parameters described in the distance-based facility data 413. In FIG. 4, the elevation width (ELW) 420, elevation height (ELH) 421, wall width (WLW) 423, wall height (WLH) 424 are input to the graphical figure generation function 434 as arguments. At this time, the facility graphical figure data thus generated will be presented in the format of map coordinate data 403, while in the figure number (FGN) 405 the values of elevation figure number (FNE) 419 and wall figure number (FNW) 422 will be stored for the perspective elevation figure and perspective wall figure, respectively. The layer number (LYN) will be the number indicative of thus generated figure.

Step 11: Shaping of Intersection (step 311)

It can be possible that the figure generated in step 310 may have an overlap of figure at the corner of skeletal graphics. For this reason the three dimensional graphics generation unit 111 will calculate the overlap of intersection to be shaped.

For example, two rectangular shapes with their ends touching at an angle to each other will have a section that overlaps and which needs to be withdrawn correctly in the resultant graphics Additionally, any cracks between the figures will need to be filled. This is accomplished summarily using mathematical and geometric assumptions.

Step 12: Storage of Perspective Map Data (step 312)

The facility graphical figure data generated in step 311 will be stored in the map data storage 101.

Step 13: Display of Perspective Map Data (step 313)

The map display unit 113 will display the graphical figure data generated in step 311. The displayed data will be the display image shown in FIG. 2C. In FIG. 5 the facility graphical figure data (elevation graphical figure data 410, wall graphical figure data 411 and 412) are generated from the graphical figure generation function 434 (coordination 439).

Step 14: Generation of Planar Graphical Figure (step 314)

In the planar graphics generation unit 112 will generate a planar data of an elevated bridge according to the graphical figure generation parameters described in the distance-based facility data 413. In this example the elevation width (ELW) 416 and wall thickness (WLW) 423 are used for input to the graphical figure generation function as graphical figure generation parameters. The facility graphical figure data generated here will be presented in the format of map coordinate data 403 (0 will be substituted for the Z coordinate). The figure number (FGN) 405 will store the values of elevation graphical figure number (FNE) 419, wall graphical figure number (FNW) 422 for planar elevation graphical figure and planar wall graphical figure, respectively. The layer number (LYN) will be the number indicative of thus generated figure.

Step 15: Shaping of Planar Figure Intersection (step 315)

It can be possible that the graphical shape generated in step 314 may have an overlap of figure at the corner of skeletal graphics. For this reason the planar graphics generation unit 112 will calculate the overlap of intersection to be shaped.

Step 16: Storage of Planar Map Data (step 316)

The facility graphical figure data generated in step 314 will be stored in the map data storage 101.

Step 17: Display of Planar Map Data (step 317)

The map display unit 113 will display the graphical figure data generated in step 314. The displayed data will be the display image shown in FIG. 2B.

As have been described above, although map data may be generated by making use of map generation steps illustrated in FIG. 3, the map generation steps may be useful for the map update that is consistent with the facility data. For example, items to be updated may include the length of perspective data, and the height of perspective data. In such a case the change of appropriate map figures will be accompanied. For the update steps, followings will be performed:

Step 1: Change of Numeric Values in the Distance-based Facility Data (step 401).

A retrieval search of the distance-based facility data will be performed by the facility data search unit 105 to change the value of data items corresponding to the graphical figure parameters.

Step 2: Erase of Map Data (step 402)

A search for the skeletal graphics figure subject to be updated will be performed so as to erase the map data generated correspondingly thereto. This corresponds to the erase of data by searching graphical figure data corresponding to the figure number (FNE 419 or FNW 422) stored in the distance-based facility data 413 from within the map coordinate data 403.

Step 3: Generation of Map Data (step 403)

The generation steps of map data shown in FIG. 3 will be performed on the skeletal graphics figure.

By relating the facility data and map data, update of facility data will update the map. In comparison with the case in which both data sets should be updated separately, the cost with respect to the update will be decreased, obsolete map data will be erased and new map data will be generated, so that any inconsistency between the facility data and map data may be avoided.

Figure 6:
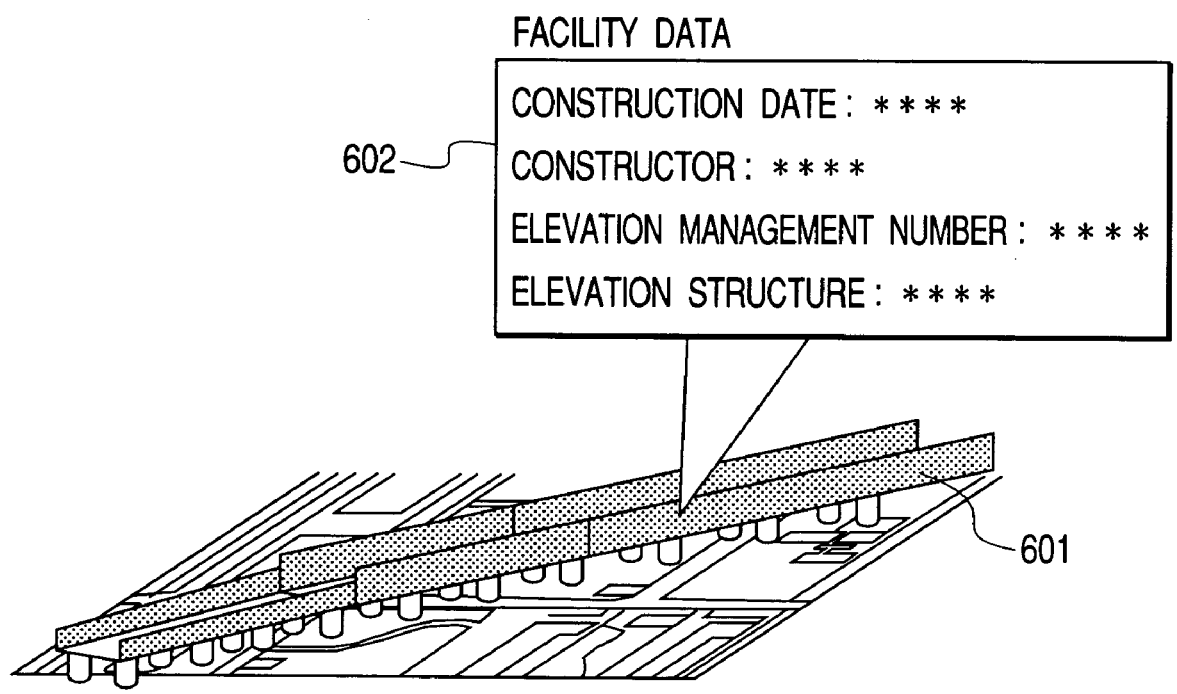
FIG. 6 is an example of attribute search in a map generated.

When generating map figures in the manner as described above, selecting thus generated figure may trigger a search for any property other than the parameters used for the graphical figure generation of facility. Now assuming that the facility data other than the data used for graphical figure generation is stored in 413. If a graphical figure is generated in the format of map coordinate data 403, then elevation graphical figure number (FNE) 419 and wall graphical figure number (FNW) 422 stored in the distance-based facility data 413 will be stored in the figure number (FGN) 405. When a graphical figure is selected the graphical figure number (FGN) 414 of the distance-based facility data 413 that matches with this figure number (FGN) will be searched and the facility data to be displayed will be retrieved for the display. FIG. 6 shows a result of retrieval search for an attribute. In this example a graphical FIG. 601 indicative of a wall graphical figure is selected, the attribute data 602 corresponding thereto will be retrieved for the display.

Figure 7:
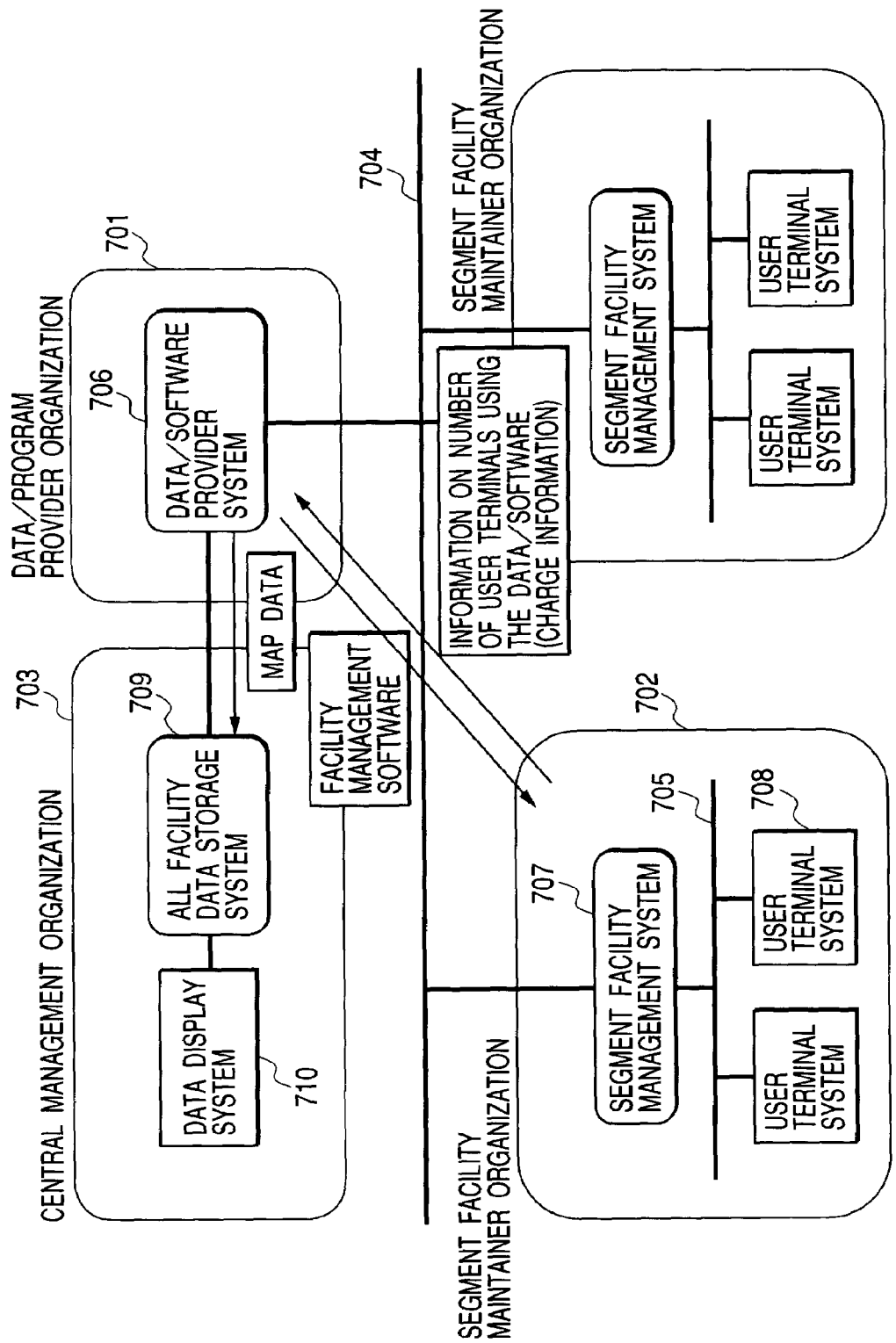
FIG. 7 is an operation method of map generation software in a typical business or state utility application.

FIGS. 2A to 2C and FIG. 6 show a display interface actually seen by the user. In FIGS. 2A to 2C, a map (FIG. 2B) is generated and displayed for which facility data has been generated from the planar map (FIG. 2A), and a perspective map (FIG. 2C) will be generated if required. From this point, by indicating a perspective graphical shape as shown in FIG. 7, a search for the facility data will be performed. Also, when inputting an instruction to update the facility data through an instruction input means, a facility based on the updated information will be generated to redisplay.

The map generation method as have been described above may be implemented not only as a proprietary hardware but also as computer software. For the facility management of very long distance, such as roads and railways, there is a manager for a predetermined segment. Since there are many users for map generation software, it will be effective that a user downloads when necessary rather than installing the map generation software for every user. In such a scheme, if the version of the software is updated corresponding to the map figure generation of new facilities, the provision of updated software may be facilitated for all of its users. In addition, the facility manager of a segment may desire to refer the map/facility data of the facility in the next segment, the map/facility data may be provided by downloading using a network.

The operating system as shown in FIG. 7 may provide the data and program. The operating system shown in FIG. 7 may comprise the following three organizations:

A program provider organization 701, is organization maintains and manages the map generation software and map/facility data. A data/software provider system 706 will be installed in this organization for management of map generation software and map/facility data to be provided.

A Segment Facility Maintainer Organization 702

This organization, for example the segment maintenance headquarters of a section of railway track, actually uses the map generation software. This organization may be consisted of a segment facility management system 707 that manages the use of map/facility data of the segments and the map generation software used by the segment facility maintainer organization, and of a terminal system 708 that actually use the map/facility data and map generation software.

A Central Management Organization 703

This organization references the map/facility data generated or updated by the segment facility maintainer organization 702. This organization may include all of the facility data storage system 709 collecting and storing map/facility data of all segments (see also ref. num. 101 and 102 in FIG. 1, and a data display system 710 for referencing data. For example, this organization could be the central management office of a railroad.

These organizations are interconnected by networks 704 and 705. The network 704 interconnects the entire organizations, while the network 705 is available from within the segment facility maintainer organization 702. These networks may be intranet based on the Internet. Now the operation of map/facility data will be described herein below in greater detail.

Map/facility data and map generation software are managed in advance by the data/program provider organization 701 using the present invention. A user terminal system 708 of the segment facility maintainer organization 702 will declare the specification of the map/facility data and map generation software to the segment facility management system 707. The segment facility management system 707 in turn will gather the request from each of the user terminal system 708 to send to the data/software provider system 706. Then the data/software provider system 706 in response to the request will distribute the segmental map/facility data and map generation software through the network to the segment facility management system 707. The data/software provider system 706 will also be capable to distribute data to the adjacent segments if requested. The requested map/facility data and map generation software will be stored in the segment facility management system 707, the user terminal system 708 will access the segment facility management system 707 to download the map/facility data and map generation software. In such a system the users of data and software are grouped for a given segment, and each group will access the segment facility management system 707 that manages the data and software, allowing shortening the time required for the preparation of data and software, since no download from the data/software provider system for each user is not necessary.

The map/facility data updated by the use in the segment facility maintainer organization 702 will be transferred to the data/program provider organization 701. When the central management organization 703 references the current map/facility data, the organization 703 will request the up-to-date data to the data/software provider system 706. The data/software provider system 706 in response will send the current map/facility data to the all facility data storage system 709. The central management organization 703 will not perform any actual work including the management and maintenance of the map/facility data, and the map generation. The map/facility data stored in the all facility data storage system 709 will be referenced by using the data display system 710.

The data/program provider organization will charge the segment facility maintainer organization 702 based on the pay-per-use of the map generation software. If the provider organization possesses the copyright of the map/facility data then the provider will charge for the provision of map/facility data. The charge may include following payment methods:

Pay-per-use License for Each User Terminal System

The data/program provider organization 701 using the present invention assigns a unique number (ID) for each user terminal system 708 to identify and charge the use by each user terminal system. The segment facility management system 707, based on the request from the user terminal, will send the ID of terminal to the data/program provider organization 701. The data/software provider system 706 then will determine the permission of use at a specific terminal, charge if available, and then send the software to the segment facility management system 707.

Pay-per-Use License for Each Segment Facility Maintainer Organization

The data/program provider organization 701 will make a contract of any given period with the segment facility maintainer organization 702 to allow the use of the map generation software.

The foregoing example may require some licensing of the map generation software. If the data/program provider organization 701 possesses some rights of map data and/or attribute data the licensing will be equally applied to the use of map/facility data.

As have been described above, in accordance with the present invention, a preferred embodiment includes a map generation system has been disclosed The system is connected to a recording means for recording map data having a skeletal graphics of facilities, and facility maintenance data coordinating the origin coordinate with the distance from the origin to the starting point and end point of a graphical figure of a facility, which system is characterized in that it includes:

a search means for searching the position corresponding to the origin from within the map data;

a means for determining the generation range of the facility graphical figure by using the data of the skeletal graphics;

a means for generating the facility graphical figure by means of a facility graphical figure generation program by using the facility parameters stored in the facility maintenance data; and a display means for displaying thus generated graphical figure of facility.

The present invention also discloses a map generation system, which system includes a map data search unit for searching for a map distance-based facility data search unit for searching for distance-based facility data;

a distance information search unit for searching for distance-related information from the distance-based facility database DB;

a skeletal graphical figure tracing unit for tracing the skeletal graphical figure data described in a map to determine the generation range of graphical figure;

facility parameter searching unit for searching facility parameters corresponding to a distance by tracing the skeletal graphical figure in the generation range of the facility graphical figure;

a graphical figure generation function library made of facility graphical figure generation function programs;

graphical figure generation function search unit for selecting a graphical figure generation function;

planar graphical figure generation unit for generating facility graphical figure by a planar figure in the facility generation range;

perspective graphical figure generation unit for generating facility graphical figure by a perspective figure in the facility generation range; and a map display unit for displaying thus generated map figures;

wherein the skeletal graphical figure data described in the map data searched and found by the map data search unit is determined of the generation range of facility graphical figure by the skeletal graphical figure search unit for searching the generation range of facility graphical figure based on the distance information to the facility described in the facility data searched and found by the distance-based facility data search unit;

wherein by using the facility parameters searched by the facility parameter search unit and found from the facility data, the facility graphical figure is generated by the perspective graphical figure generation unit by using the graphical figure generation function searched by the graphical figure generation function search unit; and wherein the map display unit displays the result.

By generating a map by means of numerical information described in distance-based facility data, the cost required for the input of map data may be decreased. The recalculation and regeneration of map data by updating the distance-based facility data, update cost of a map may be lowered in comparison with a case in which both the facility data and map data are manually updated, while the inconsistency between the distance-based facility data and map data can be avoided.

What is claimed is:

1. A map generation system wherein:

said system is connected to a recording means for recording map data having skeletal graphics of facilities, and being connected to facility management data that coordinates an origin coordinate with a distance from the origin coordinate to a starting point and to an end point of a graphical figure of a facility, wherein said system further comprises:

a search means for searching for a position corresponding to said origin coordinate from within said map data;

a means for determining a proper generation range of said facility graphical figure by using data of said skeletal graphics;

a means for generating said facility graphical figure by means of a facility graphical figure generation program by using facility parameters stored in said facility management data; and a display means for displaying a generated graphical figure of said facilities on a map generated from said map data.

2. A map generation system according to claim 1, wherein:
said means for generating said facility graphical figure generates a planar graphical figure or perspective graphical figure of said facilities.

3. A map generation system according to claim 1, further comprising:
an instruction input means; and
a search means for searching instruction information received from said instruction input means,
wherein said map data is displayed including the facility managed as indicated by searched facility management data.

4. A map generation system according to claim 1, further comprising:
an instruction input means; and
a playback means for playing back the facility managed by said facility management data based on updated facility management information, upon receipt of an update instruction of said facility management data through said instruction input means.

5. A map generation system according to claim 4, wherein said playback means deletes graphical figure data of a facility managed by said stored facility management data.

6. A map generation system, comprising:
a recording means for recording map data, and facility management information of facilities in the map data;
a means for displaying on a display means said map data that displays at least one of the facilities;
a means for displaying distance information from an origin to a starting point and to an end point of said facility and an attribute information of the facility;
a means for receiving input for changing at least any one of said displayed distance information or said attribute information; and
a means for redisplaying on said display means the facility based on said input for changing by generating on said map data.

7. A map generation system according to claim 4, further comprising:
an instruction means,
wherein said display means displays the facility data of said facility when said displayed facility is pointed out on said display means.

8. A map generation system comprising:
providing a system connected to a recording means for recording map data having a skeletal graphics of facilities, said system being connected to facility management data that coordinates an origin coordinate with a distance from the origin coordinate to a starting point and to an end point of a graphical figure of a facility;
providing a search means for searching for a position corresponding to said origin coordinate from within said map data;
providing a means for determining a proper generation range of said facility graphical figure by using said skeletal graphics;
providing a means for generating said facility graphical figure by means of a facility graphical figure generation program by using facility parameters stored in said facility management data; and
providing a display means for displaying a generated graphical figure of said facilities on a map generated from said map data.

9. A map generation system, as in claim 8 further comprising:
providing from the system, the map data having a skeletal graphics of the facilities, the facility management data, and the generated graphical figure to a segment facility which manages one geographic segment of an overall network, upon receipt of a request from a user in the segment facility to the system; and
updating an all segments facility data storage subsystem located in a central management organization for storing the map data having a skeletal graphics of the facilities, the facility management data, and the generated graphical figure to a segment facility for each segment in the network.

10. The map generation system of claim 9, further comprising:
sending updated information from the user to the system, which in turn sends the updated information to the all segments facility data storage subsystem;
wherein a usage number of the user is sent through the segment facility to the system as billing information.

11. A map generating and graphical display system for use with a geographic information system (GIS) for mapping data from a map database and a distance based facility parameters database comprising:
a map data search unit;
a facility parameters database search unit;
a graphics generation information search unit for retrieving facility parameters including a base coordinate from the facility parameters database search unit and for placing the base coordinate onto skeletal graphics from the map database;
a skeletal graphics search and trace unit for tracing on a map retrieved from the map database via the map data search unit, and for finding skeletal graphics of at least one facility on the map selected from the map database wherein the skeletal graphics are included on the map and are then traced upon from the base coordinate to include a starting point and an ending point which are stored;
a graphical figure generation function library searchable by a graphical figure generation function search unit using a graphical figure generation number from the facility parameters database and which is connected to the graphics generation information search unit;
a graphics generation dimension selector unit for searching for dimension parameters of the facilities listed in the facility parameters database and connected to the skeletal graphics search and trace unit; and
a three dimensional graphics generation unit for generating a 3D graphical representation of the facility on the map to be stored and displayed.

12. The system of claim 11 further comprising:
a planar graphics generation unit for generating a 2D graphical representation of the facility on the map to be stored and displayed.

13. The system of claim 11 further comprising:
an updating unit to update the distance based facility parameters database.

* * * * *